United States Patent
Andersen et al.

(10) Patent No.: US 12,091,907 B2
(45) Date of Patent: Sep. 17, 2024

(54) VACUUM INSULATED GLAZING UNIT WITH DENSE SIDE SEAL MATERIAL

(71) Applicant: VKR HOLDING A/S, Hørsholm (DK)

(72) Inventors: Søren Vejling Andersen, Hørsholm (DK); Johnsen Simon, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 506 days.

(21) Appl. No.: 17/413,131

(22) PCT Filed: Nov. 28, 2019

(86) PCT No.: PCT/DK2019/050369
§ 371 (c)(1),
(2) Date: Jun. 11, 2021

(87) PCT Pub. No.: WO2020/125880
PCT Pub. Date: Jun. 25, 2020

(65) Prior Publication Data
US 2022/0065029 A1    Mar. 3, 2022

(30) Foreign Application Priority Data
Dec. 21, 2018    (DK) .................................. 201870849

(51) Int. Cl.
*E06B 3/673* (2006.01)
*E06B 3/66* (2006.01)
*E06B 3/663* (2006.01)

(52) U.S. Cl.
CPC .......... *E06B 3/6736* (2013.01); *E06B 3/6612* (2013.01); *E06B 3/66333* (2013.01); *E06B 3/67334* (2013.01); *E06B 3/67391* (2013.01); *E06B 2003/66338* (2013.01)

(58) Field of Classification Search
None
See application file for complete search history.

(56) References Cited

U.S. PATENT DOCUMENTS

| 9,499,428 B2 | 11/2016 | Maloney |
| 2002/0035852 A1 | 3/2002 | Wang |
| 2005/0217319 A1 | 10/2005 | Yoshizawa |
| 2006/0191215 A1 | 8/2006 | Stark |
| 2012/0213953 A1 | 8/2012 | Dennis |
| 2014/0087099 A1 | 3/2014 | Veerasamy |
| 2015/0030789 A1 | 1/2015 | Matsumoto |
| 2017/0002603 A1 * | 1/2017 | Veerasamy ............. C03C 27/08 |

FOREIGN PATENT DOCUMENTS

| WO | WO-2013039940 A1 * | 3/2013 | ............. C03C 27/06 |
| WO | 2018150016 A1 | 8/2018 | |

OTHER PUBLICATIONS

International Search Report for corresponding application PCT/DK2019/050369 filed Nov. 28, 2019; Mail date Feb. 21, 2020.
Written Opinion of the International Search Authority for corresponding application PCT/DK2019/050369 filed Nov. 28, 2019; Mail date Feb. 21, 2020.

* cited by examiner

*Primary Examiner* — Queenie S Dehghan
(74) *Attorney, Agent, or Firm* — CANTOR COLBURN LLP

(57) ABSTRACT

The present disclosure relates to a vacuum insulated glazing (VIG) unit and the method for producing such. Furthermore, the present disclosure relates to a window comprising a VIG unit enclosed in a frame.

18 Claims, 8 Drawing Sheets

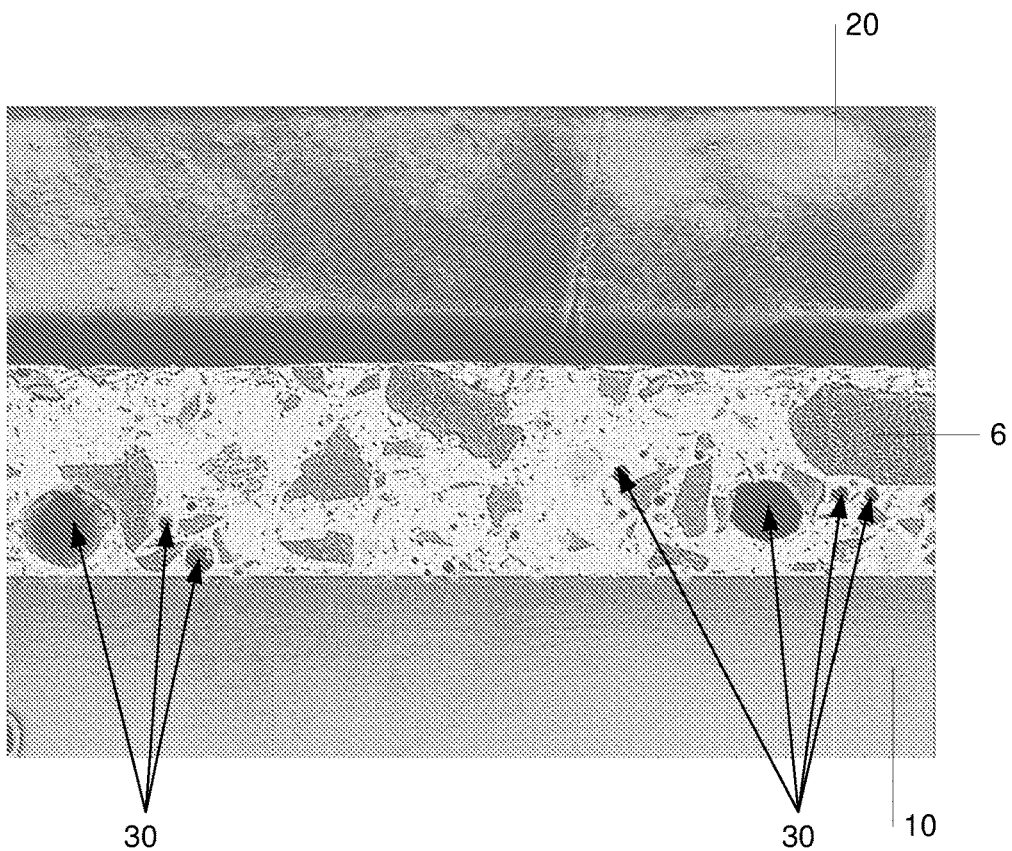
Fig. 5A – prior art solution
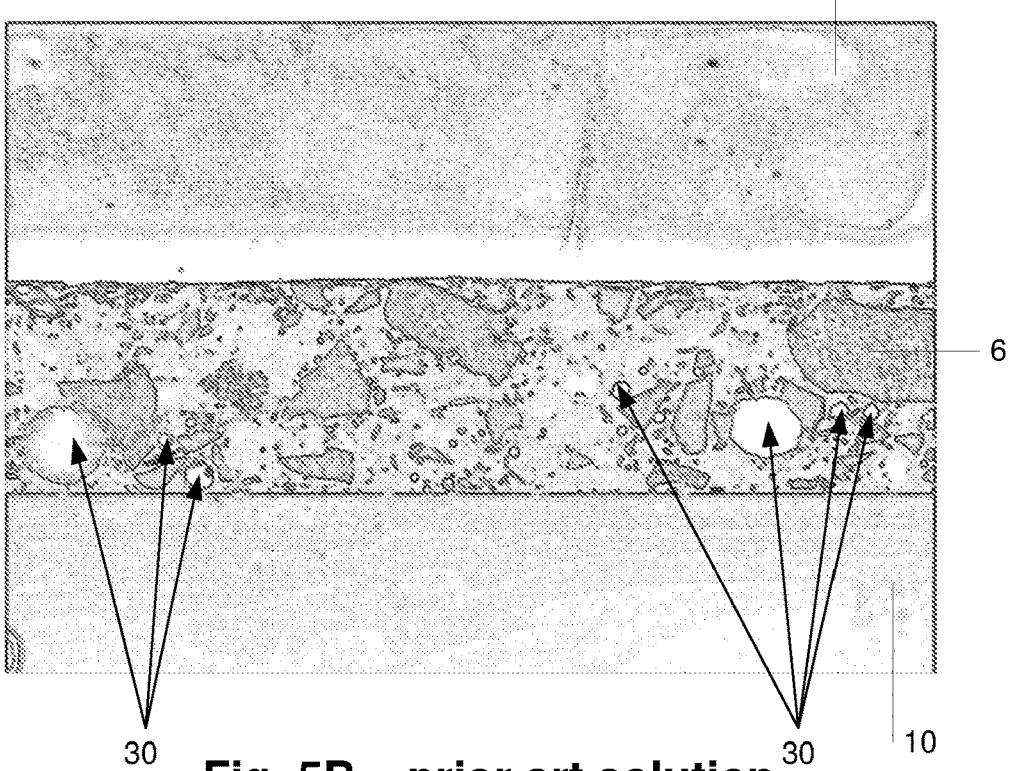
Fig. 5B – prior art solution

VACUUM INSULATED GLAZING UNIT WITH DENSE SIDE SEAL MATERIAL

The present disclosure relates to a vacuum insulated glazing (VIG) unit and the method for producing such. Furthermore, the present disclosure relates to a window comprising a VIG unit enclosed in a frame.

BACKGROUND

Vacuum-insulated glass (VIG) units typically include two or more glass panes, spaced by an array of support structures e.g. pillars distributed between the glass panes. The glass panes are sealed with a side sealing at the periphery to provide an evacuated space (i.e., vacuum) located between the glass panes. The evacuated space is sealed at a reduced pressure such as 0.001 millibars or less in order to ensure an insulating effect of the VIG unit. The overall construction provides improved thermal and noise insulating properties compared to ordinary glass windows. The side sealing at the periphery of the glass sheets accordingly needs to be tight in order to provide that the desired internal pressure in the void can be maintained for several years. To prevent sagging and contact between adjacent glass panes, the support structures e.g. pillars can serve as discrete spacers between adjacent glass panes.

When sealing the periphery to provide an evacuated space (i.e., vacuum) located between the glass panes, the side seal material is heated such that it melts to ensure that the side seal material adhere to the glass panes. During the melting procedure, gaseous inclusions are normally formed, which causes the side seal material to expand, and possibly foam as the gaseous inclusions outgas.

There are various known ways of manufacturing VIG units. Among these are the solution disclosed in US 2005/0217319, where the two glass panes are joined by general heating and by locally heating the side seal material to obtain a molten material. After cooling the side seal material solidifies whereby the two glass panes are joined. Exhausting air from the space in-between the two glass panes is conducted by way of an evacuation cup. Another method, also described in US 2005/0217319 is to conduct the heating and the local heating of the side seal material in a vacuum chamber whereby the glass panels are joined and evacuated in one step. According to this method, however, re-melting of the side seal material in vacuum causes gases contained therein to vigorously foam wherefore it is necessary to melt the side seal material slowly over a sufficient time to fully defoam the internal gases. Otherwise, if gases remains in the material, the glass panes cannot be completely joined.

Another solution is disclosed in U.S. Pat. No. 9,499,428 where a side seal frit material is pre-heated in a non-vacuum space at temperatures between 175-225 degree Celsius to help reduce the foaming from binder burnouts during the following heating and joining step.

Hence, as seen, one or more of the above mentioned solutions provides drawbacks with regard to e.g. manufacturing speed/capacity, end product quality and/or other drawbacks which the present disclosure may help to solve.

SUMMARY

Disclosed herein is a method for producing a vacuum insulated glazing (VIG) unit, the VIG unit comprising:
  a first glass pane and a second glass pane arranged in parallel, the first glass pane and the second glass pane each having inner surfaces opposing each other;
  spacers arranged between the opposed inner surfaces, and
  a dense side seal material peripherally arranged between the first glass pane and the second glass pane creating a sealed cavity between the glass panes.

In a first aspect, the method comprises:
  providing a first glass pane having an inner surface with a peripheral edge;
  positioning a side seal material on the peripheral edge of the inner surface of the first glass pane, wherein the side seal material comprises a solder glass material component;
  pre-heating the side seal material to a pre-heating temperature ($T_{PH}$) using a pre-heating heat source, wherein at the pre-heating temperature ($T_{PH}$) the side seal material foams and densifies to form a dense side seal material,
  wherein during foaming of the side seal material gaseous inclusions from the side seal material outgasses,
  wherein the side seal material has:
    an initial side seal density prior to being pre-heated;
    a foaming side seal density during foaming of the side seal material, wherein the initial side seal density is larger than the foaming side seal density by at least 50%; and
    a dense side seal density after pre-heating of the side seal material where the dense side seal material is formed, wherein the dense side seal density is larger than the foamed side seal density by at least 50%.

In a second aspect, the method comprises:
  providing a first glass pane having an inner surface with a peripheral edge;
  positioning a side seal material on the peripheral edge of the inner surface of the first glass pane, wherein the side seal material comprises a solder glass material component;
  pre-heating the side seal material to a pre-heating temperature ($T_{PH}$) using a pre-heating heat source, wherein at the pre-heating temperature ($T_{PH}$) the side seal material foams and densifies to form a dense side seal material, wherein during foaming of the side seal material gaseous inclusions from the side seal material outgasses, wherein the pre-heating heat source comprises at least a first pre-heating heat source, the first pre-heating heat source being a laser emitting light in the near-infrared or infrared wavelength range, wherein the laser is a continuous wave laser or a pulsed laser.

The method of the first and second aspect further comprises:
  proving a second glass pane having an inner surface,
  proving spacers, and
  assembling the VIG unit such that the VIG unit comprises:
    the first glass pane and the second glass pane arranged in parallel with the inner surfaces opposing each other;
    spacers arranged between the opposed inner surfaces, and
    the dense side seal material peripherally arranged between the first glass pane and the second glass pane creating a sealed cavity between the glass panes.

Disclosed in a third aspect is a vacuum insulated glazing unit comprising:
  a first glass pane and a second glass pane arranged in parallel, the first glass pane and the second glass pane each having inner surfaces opposing each other;

spacers arranged between the opposed inner surfaces, and a dense side seal material peripherally arranged between the first glass pane and the second glass pane creating a sealed cavity between the glass panes, wherein the dense side seal material comprises a solder glass material component, and wherein gaseous inclusions in the dense side seal material constitutes less than 15% of a total volume of the dense side seal material, such as less than 10% of the total volume, such as less than 5% of the total volume, such as less than 1% of the total volume.

By foaming is meant that the side seal material bubbles beyond its initial surface. The bubbles have sufficiently high surface tension to remain as bubbles whereby the surface area increases due to the large amount of heat emitted from the material. That in turns results in that the side seal material has a low thermal conductivity. When the gas bubbles are tiny, they are also referred to as porosities. The solubility of gas obeys Henry's law, that is, the amount of a dissolved gas in a liquid is proportional to its partial pressure.

By outgassing is meant that the gaseous inclusion formed during the heating and melting of the side seal material are allowed to escape the side seal material. This will normally be seen as a foaming of the side seal material. If the side seal material contains organic substances, these may also decompose and oxidize in the course of melting to form gaseous inclusions, which outgasses.

By gaseous inclusions are meant gasses formed inside the side seal material during the heating and melting of side seal material. The gaseous inclusion may be formed due to organic substances contained in the side seal material, which form gasses during the melting of the side seal material.

By spacers are meant support structures, e.g. pillars that serves as discrete spacers between adjacent glass panes. The spacers can help to prevent sagging and contact between adjacent glass panes. The spacers can be integral or adhered to the inner surfaces of the glass panes. The spacers can also be discrete and held in position by atmospheric pressure on the outer surfaces of the glass panes. The spacers may have any suitable shape, for example spherical, cylindrical, square, rectangular, rod-like, bead-like, oval, trapezoidal, or the like.

By densifies is meant that the side seal material become dense after the gaseous inclusions has outgassed, whereby the gaseous inclusions in the side seal material constitutes a miner amount of the total volume of the side seal material in percent. By a densification of the side seal material the density is increased, i.e. the amount of mass per unit volume increases. The side seal material can be fully or nearly fully densified when the gaseous inclusions in the dense side seal material constitutes a very minor part of the total volume. The side seal material has an initial side seal density prior to being pre-heated, and a foaming side seal density during foaming of the side seal material, and a dense side seal density when the side seal material has densified after foaming.

Foaming of the side seal material is normally an unwanted side effect when producing VIG units. In the step of joining by heating the two glass panes in vacuum, the side seal material is re-melted which causes gasses in the side seal material to vigorously foam. The gasses remaining in the side seal material during joining of the two glass panes creates a porous side seal.

By pre-heating the side seal material to a pre-heating temperature ($T_{PH}$) using a pre-heating heat source, the side seal material foams and densifies to form a dense side seal material, which entails that the gaseous inclusions from the side seal material has outgasses. During the following heating and joining of the first glass pane with another second glass pane to form a VIG unit, the side seal material will not foam since the side seal material is already outgassed and dense, which means that the two glass panes can be completely joined and that the space located between the two glass panes can be fully evacuated.

By the above aspects are obtained a side seal material, which can be heated in a heating step without foaming, which significantly eases production of VIG units. Formation of crystalline glass structures caused by foaming during sealing of the two glass panes, are also avoided. This provides a stronger seal between the two glass panes.

By the above aspects are further obtained a high quality VIG unit. The side seal material are absent of crystalline glass structures caused by foaming during sealing of the two glass panes. This provides a stronger seal between the two glass panes.

Disclosed in a fourth aspect is the use of the vacuum insulated glazing unit as described herein for a window or a refrigerator door.

BRIEF DESCRIPTION OF THE DRAWINGS

Various examples are described hereinafter with reference to the figures. Like reference numerals refer to like elements throughout. Like elements will, thus, not be described in detail with respect to the description of each figure. It should also be noted that the figures are only intended to facilitate the description of the examples. They are not intended as an exhaustive description of the claimed invention or as a limitation on the scope of the claimed invention. In addition, an illustrated example needs not have all the aspects or advantages shown. An aspect or an advantage described in conjunction with a particular example is not necessarily limited to that example and can be practiced in any other examples even if not so illustrated, or if not so explicitly described.

FIG. 10 shows a first glass pane with a side seal material peripherally arranged around the periphery on the inner surface of the first glass pane.

FIG. 5A show a cross sectional SEM image of side seal material in a VIG unit produced by a conventional known method and FIG. 5B is a contrast image of the SEM image in FIG. 5A.

DETAILED DESCRIPTION

Figure 1A:
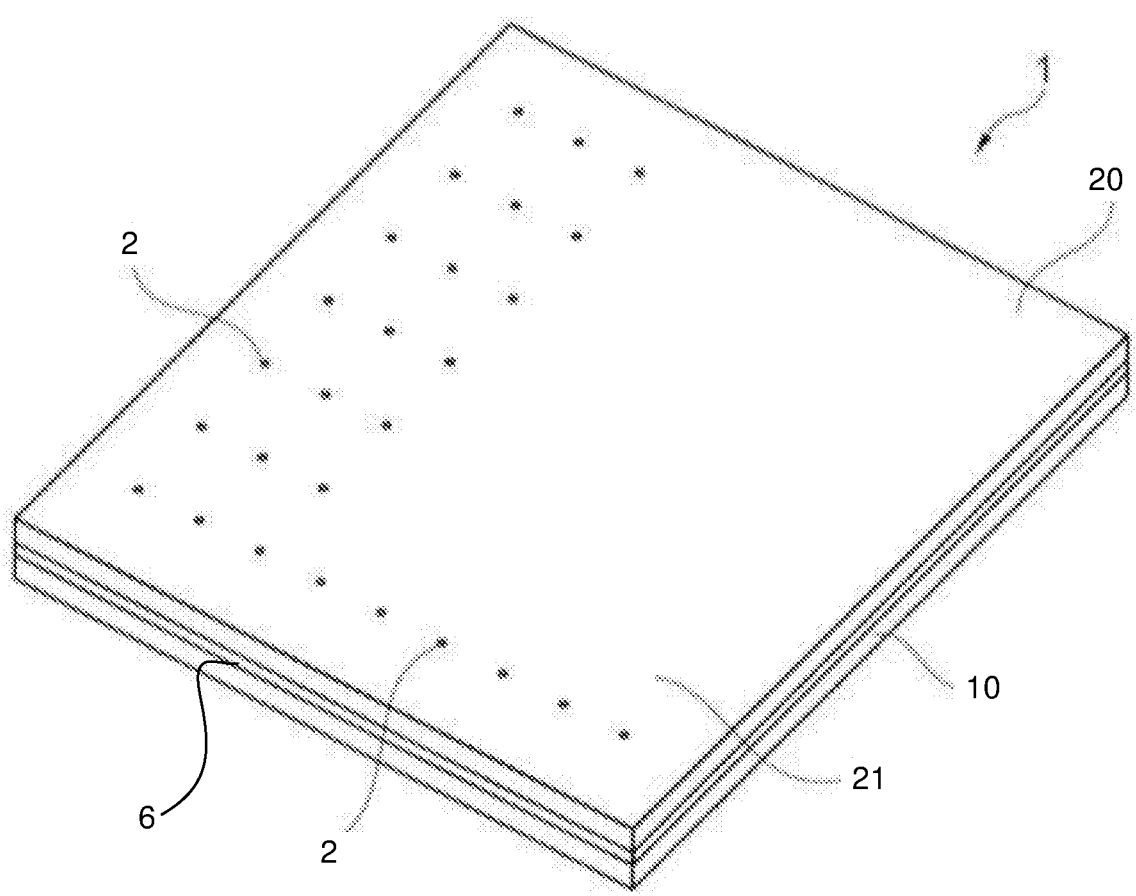
FIGS. 1A-B show an example of a vacuum insulated glazing (VIG) unit in a top-down slightly sideward view (1A) and a side-ward view (1B).

Exemplary examples will now be described more fully hereinafter with reference to the accompanying drawings. In this regard, the present examples may have different forms and should not be construed as being limited to the descriptions set forth herein. Accordingly, the examples are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, thicknesses of a plurality of layers and areas are illustrated in an enlarged manner for clarity and ease of description thereof. When a layer, area, element, or plate is referred to as being "on" another layer, area, element, or plate, it may be directly on the other layer, area, element, or plate, or intervening layers, areas, elements, or plates may be present therebetween. Conversely, when a layer, area, element, or plate is referred to as being "directly on" another layer, area, element, or plate, there are no intervening layers, areas, elements, or plates therebetween. Further when a layer, area, element, or plate is referred to as being "below" another layer, area, element, or plate, it may be directly below the other layer, area, element, or plate, or intervening layers, areas, elements, or plates may be present therebetween. Conversely, when a layer, area, element, or plate is referred to as being "directly below" another layer, area, element, or plate, there are no intervening layers, areas, elements, or plates therebetween.

The spatially relative terms "lower" or "bottom" and "upper" or "top", "below", "beneath", "less", "above", and the like, may be used herein for ease of description to describe the relationship between one element or component and another element or component as illustrated in the drawings. It will be understood that the spatially relative terms are intended to encompass different orientations of the device in use or operation, in addition to the orientation depicted in the drawings. For example, in the case where a device illustrated in the drawings is turned over, elements described as being on the "lower" side of other elements, or "below" or "beneath" another element would then be oriented on "upper" sides of the other elements, or "above" another element. Accordingly, the illustrative term "below" or "beneath" may include both the "lower" and "upper" orientation positions, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below, and thus the spatially relative terms may be interpreted differently depending on the orientations described.

Throughout the specification, when an element is referred to as being "connected" to another element, the element is "directly connected" to the other element, or "electrically connected" to the other element with one or more intervening elements interposed therebetween.

The terminology used herein is for the purpose of describing particular examples only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Exemplary examples are described herein with reference to cross section illustrations that are schematic illustrations of idealized examples, wherein like reference numerals refer to like elements throughout the specification. As such, variations from the shapes of the illustrations as a result, for example, of manufacturing techniques and/or tolerances, are to be expected. Thus, examples described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Some of the parts which are not associated with the description may not be provided in order to specifically describe exemplary examples of the present disclosure.

Disclosed herein is a method for producing a vacuum insulated glazing (VIG) unit, the VIG unit comprising:
  a first glass pane and a second glass pane arranged in parallel, the first glass pane and the second glass pane each having inner surfaces opposing each other;
  spacers arranged between the opposed inner surfaces, and
  a dense side seal material peripherally arranged between the first glass pane and the second glass pane creating a sealed cavity between the glass panes.
In a first aspect, the method comprises:
  providing a first glass pane having an inner surface with a peripheral edge;
  positioning a side seal material on the peripheral edge of the inner surface of the first glass pane, wherein the side seal material comprises a solder glass material component;
  pre-heating the side seal material to a pre-heating temperature ($T_{PH}$) using a pre-heating heat source, wherein at the pre-heating temperature ($T_{PH}$) the side seal material foams and densifies to form a dense side seal material, wherein during foaming of the side seal material gaseous inclusions from the side seal material outgasses, wherein the side seal material has:
an initial side seal density prior to being pre-heated;
a foaming side seal density during foaming of the side seal material, wherein the initial side seal density is larger than the foaming side seal density by at least 50%; and
a dense side seal density after pre-heating of the side seal material where the dense side seal material is formed, wherein the dense side seal density is larger than the foamed side seal density by at least 50%.

In a second aspect, the method comprises:
providing a first glass pane having an inner surface with a peripheral edge;
positioning a side seal material on the peripheral edge of the inner surface of the first glass pane, wherein the side seal material comprises a solder glass material component;
pre-heating the side seal material to a pre-heating temperature ($T_{PH}$) using a pre-heating heat source, wherein at the pre-heating temperature ($T_{PH}$) the side seal material foams and densifies to form a dense side seal material, wherein during foaming of the side seal material gaseous inclusions from the side seal material outgasses, wherein the pre-heating heat source comprises at least a first pre-heating heat source, the first pre-heating heat source being a laser emitting light in the near-infrared or infrared wavelength range, wherein the laser is a continuous wave laser or a pulsed laser.

The method of the first and second aspect further comprises:
proving a second glass pane having an inner surface,
proving spacers, and
assembling the VIG unit such that the VIG unit comprises:
the first glass pane and the second glass pane arranged in parallel with the inner surfaces opposing each other;
spacers arranged between the opposed inner surfaces, and
the dense side seal material peripherally arranged between the first glass pane and the second glass pane creating a sealed cavity between the glass panes.

Disclosed in a third aspect is a vacuum insulated glazing unit comprising:
a first glass pane and a second glass pane arranged in parallel, the first glass pane and the second glass pane each having inner surfaces opposing each other;
spacers arranged between the opposed inner surfaces, and
a dense side seal material peripherally arranged between the first glass pane and the second glass pane creating a sealed cavity between the glass panes,
wherein the dense side seal material comprises a solder glass material component, and wherein gaseous inclusions in the dense side seal material constitutes less than 15% of a total volume of the dense side seal material, such as less than 10% of the total volume, such as less than 5% of the total volume, such as less than 1% of the total volume.

Disclosed in a fourth aspect is the use of the vacuum insulated glazing unit as described herein for a window or a refrigerator door.

In one or more examples of the first aspect, the pre-heating heat source comprises at least a first pre-heating heat source being a near-infrared or an infrared light source. The near-infrared or infrared light source may be:
a continuous wave laser or a pulsed laser, wherein the continuous wave laser or a pulsed laser are emitting light in the near-infrared or infrared wavelength range, or
an infrared lamp, such as an infrared quartz lamp.

By near-infrared (NIR) is meant light in the wavelength range between 750 nm-1.400 nm (0.75-1.4 µm) and by infrared (IR) is meant light in the wavelength range between 750 nm-15.000 nm (0.75-15 µm). One of the advantages of heating with a NIR or an IR light source is that it optically absorbs directly in the side seal material.

In one or more examples, the near-infrared or infrared light source is an infrared lamp, such as an infrared quartz lamp.

In one or more examples, the near-infrared or infrared light source is a continuous wave laser or a pulsed laser, wherein the continuous wave laser or a pulsed laser are emitting light in the near-infrared or infrared wavelength range. By using a laser, a localized, efficient, and fast pre-heating of the side seal material is possible.

In one or more examples of the second aspect, the side seal material has:
an initial side seal density prior to being pre-heated;
a foaming side seal density during foaming of the side seal material, wherein the initial side seal density is larger than the foaming side seal density by at least 50%; and
a dense side seal density after pre-heating of the side seal material where the dense side seal material is formed, wherein the dense side seal density is larger than the foamed side seal density by at least 50%.

In one or more examples, side seal material is also applied to the second glass pane. Thus, the method may further comprise:
positioning the side seal material on the peripheral edge of the inner surface of the second glass pane, after providing the second glass pane but prior to assembling the VIG unit;
pre-heating the side seal material to a pre-heating temperature ($T_{PH}$) using a pre-heating heat source, wherein at the pre-heating temperature ($T_{PH}$) the side seal material foams and densifies to form a dense side seal material, wherein during foaming of the side seal material gaseous inclusions from the side seal material outgasses.

In one or more examples, the pre-heating of the side seal material is conducted at atmospheric pressure or under reduced pressure in a vacuum chamber. If conducted at atmospheric pressure, the pre-heating will normally require longer time compared to the conditions where a vacuum chamber is used.

Also, an inert gas flush may be used, possibly in combination with moderate vacuum, to assist with the outgassing procedure.

Independently of which pressure the pre-heating is conducted at, the side seal material can be outgassed during the pre-heating process resulting in a dense side seal material, which can subsequently be heated in a heating step in a vacuum chamber without foaming.

In one or more examples, the pre-heating of the side seal material is conducted under reduced pressure in a vacuum chamber. This reduces the time required for the outgassing to be completed and a dense side seal material obtained.

In one or more examples, the pressure in the vacuum chamber is no higher than 0.5 mbar, such as no higher than 0.1 mbar, such as no higher than 0.05 mbar, such as no higher than 0.01 mbar, such as no higher than 0.005 mbar, such as no higher than 0.001 mbar, such as no higher than 0.0005 mbar, such as no higher than 0.0001 mbar.

After the side seal material has outgassed and densified—either under atmospheric pressure or under pressure in a vacuum chamber—it may be further densified by subjecting it to an increased pressure in a vacuum chamber. If the pre-heating is already conducted under reduced pressure in a vacuum chamber, the pressure may be increased further to an even more reduced pressure.

In one or more examples, gaseous inclusions in the dense side seal material constitutes less than 5% of the total volume, such as less than 1% of the total volume.

In one or more examples, the dense side seal material contains less than 5%, such as less than 2%, such as less than 1% porosity by volume.

In one or more examples, the dense side seal material has an ultra-low porosity and high density approaching that of a bulk material.

In one or more examples, pre-heating the side seal material to form the dense side seal material where gaseous inclusions from the side seal material has outgassed takes less than 5 minutes, such as less than 2 minutes, such as less than 1 minute, such as less than 30 seconds at locations where the pre-heating heat source is heating the side seal material. By locations where the pre-heating heat source is heating the side seal material is meant is included the situations, where the pre-heating heat source is not covering the entire side seal material, and where the pre-heating heat source and the first glass pane need to be moved relatively to each other in order to heat the entire side seal material. By locations where the pre-heating heat source is heating the side seal material is therefore meant the positions which is heated by the heat source, when the entire side seal material is not heated at once.

In one or more examples, the total time for pre-heating all of the side seal material is a period of time between 1 and 30 minutes, such as between 1 and 15 minutes, such as between 2 and 10 minutes, such as between 3 and 7 minutes or such as between 5 and 6 minutes.

The process of pre-heating the side seal material to form the dense side seal material where gaseous inclusions from the side seal material has outgasses may take 3-10 minutes, such as 4-6 minutes if all of the side seal material is heated with the pre-heating heat source simultaneously. This could for example be the case if the entire side seal material is heated by one or more infrared lamps at once.

In one or more examples, gaseous inclusions in the dense side seal material constitutes less than 15% of a total volume of the dense side seal material.

In one or more examples, gaseous inclusions in the dense side seal material constitutes less than 10% of the total volume.

In one or more examples, gaseous inclusions in the dense side seal material constitutes less than 5% of the total volume.

In one or more examples, gaseous inclusions in the dense side seal material constitutes less than 1% of the total volume.

In one or more examples, the side seal material has an initial side seal density prior to being pre-heated, and a foaming side seal density during foaming of the side seal material, wherein the initial side seal density is larger than the foaming side seal density. This is due to the gaseous inclusion, which forces the side seal material to expand during foaming.

In one or more examples, the initial side seal density is larger than the foaming side seal density by at least 50%, such as at least 60%, such as at least 70%, such as at least 80%, such as at least 90%, such as at least 100%, such as at least 120%, such as at least 150%, such as at least 175%, such as at least 200%, such as at least 250%, such as at least 300%, such as at least 350%, such as at least 400%.

In one or more examples, the dense side seal material has a dense side seal density, wherein the dense side seal density is larger than the foaming side seal density. This is due to the collapse and densification of the side seal material after the outgassing of the gaseous inclusion.

In one or more examples, the dense side seal density is larger than the foaming side seal density by at least 50%, such as at least 60%, such as at least 70%, such as at least 80%, such as at least 90%, such as at least 100%, such as at least 120%, such as at least 150%, such as at least 175%, such as at least 200%, such as at least 250%, such as at least 300%, such as at least 350%, such as at least 400%.

In one or more examples, the dense side seal density is similar to the initial side seal density. By similar is meant that the difference between the initial side seal density and the dense side seal density varies with less than 30%, such as less than 20%, such as less than 10%, such as less than 5%.

In one or more examples, the pre-heating heat source is directing the majority of the heat at the side sealing materiel. The area of the first glass pane not being covered is thereby not heated by the pre-heating heat source or only receiving a small amount of heat.

In one or more examples, the laser is a diode laser, a fibre laser, a solid state laser, or similar. An example of a laser is a 980 nm diode laser. A Thulium fibre laser (e.g. a 200 w laser) emitting light in the IR wavelength range around 2.05 µm is a further example of suitable laser for the pre-heating heat source. Due to the lower absorption in the side seal material at 2 µm compared to the absorption in the NIR wavelength, the process is more uniform.

A solid state laser such as an yttrium aluminum garnet (YAG) laser, e.g. a Yb:YAG laser (Ytterbium-doped YAG laser), a Tm:YAG laser (Thulium-doped YAG laser), a Mo:YAG laser (Erbium-doped YAG laser), a Er:YAG laser (Erbium-doped YAG laser), or a Nd:YAG laser (Neodymium-doped YAG laser), e.g. emitting light in the NIR wavelength range such as at 946 nm, 1064 nm, or 1319 nm, may also be used. Other types of laser may also be used, such as He-Ne lasers emitting light at e.g. 1152 nm, 1523 nm, or 3391 nm, a Ti:Sapphire laser emitting light in the wavelength range around e.g. 800 nm, an InGaAs laser emitting light in the wavelength range of 904-1065 nm, or 1270-1330 nm, or 1430-1570 nm, or a $CO_2$ laser.

In one or more examples, the side seal material has a width $w_{SSM}$ and wherein at the position where the laser light irradiates the side seal material with light having a spot size being at least 10% larger than the width $w_{SSM}$ of the side seal material. In this manner, it is ensured that the side seal material is heated evenly across the width of the material. If an NIR/IR lamp is used, it will also be ensured that the width of the NIR/IR light exceeds that of the side seal material.

To ensure that the laser beam spot size is larger than the width of the side seal material $w_{SSM}$, the laser may be de-focussed and possibly collimated to have a larger spot size than that of the light being emitted from the laser.

In one or more examples, $w_{SSM}$ is between 5-10 mm and wherein the spot size of the laser light is between 10-20 mm in diameter. When pre-heating of the side seal material, the pre-heating heat source needs to move to cover either the entire side seal material or the first glass pane needs to move. Raster scanning may be one manner of moving a laser being the pre-heating heat source.

In one or more examples, the pre-heating of the side seal material is obtained by moving the first pre-heating heat source around the peripheral edge of the inner surface of the first glass pane.

In one or more examples, the pre-heating of the side seal material is obtained by moving the first pre-heating heat source around the peripheral edge of the inner surface of the first glass pane multiple times in a raster scan manner.

When pre-heating the side seal material in the raster scanning manner, the difference in temperature at different locations on the side seal material can be minimized and a more uniform heating of the entire side seal material is obtainable. This is in particular relevant when the pre-heating heat source is a laser. As a laser normally has a spot size comparable to that of the width of the side seal material, the laser is normally only able to illuminate a small part of the peripheral edge covered by the side seal material at the time. Raster scanning the peripheral edge of the side seal material multiple times with a laser will ensure the uniform heating of the side seal material.

Also, the difference in the temperature of 1) the side seal material exposed to heat from the pre-heating heat source in a raster scanning manner and 2) the glass pane below the side seal material, can be lowered when using the raster scanning approach, since the side seal material is heating slower and more uniformly allowing heat transfer from the side seal material to be transferred to the glass pane below the side seal material occur.

In one or more examples, each part of the side seal material is exposed to light from the first pre-heating heat source at least 5 times, such as at least 10 times, such as at least 20 times, such as at least 50 times.

In one or more examples, the first pre-heating heat source moves around the peripheral edge of the inner surface of the first glass pane such that each part of the side seal material is exposed to heat from the first pre-heating heat source at least 2 times per minute, such as at least 5 times per minute, such as at least 10 times per minute, such as at least 20 times per minute.

In one or more examples, the pre-heating of the side seal material is obtained by moving the first glass pane relative to the first pre-heating heat source.

In one or more examples, the pre-heating of the side seal material is obtained by:
  moving the first pre-heating heat source along a first periphery of the first glass pane;
  turning the first glass pane 90 degree; and
  moving the first pre-heating heat source along a second periphery of the first glass pane.

In order to pre-heat the side seal material on a third periphery and a fourth periphery of the first glass, the method may comprise further:
  turning the first glass pane 90 degrees;
  moving the first pre-heating heat source along a third periphery of the first glass pane;
  turning the first glass pane 90 degrees; and
  moving the first pre-heating heat source along a fourth periphery of the first glass pane.

The first periphery on the first glass pane is opposite of the third periphery and the second periphery on the first glass pane is opposite of the fourth periphery.

In one or more examples, the pre-heating heat source comprises a second pre-heating heat source being a near-infrared or an infrared light source.

In one or more examples, the pre-heating of the side seal material is further obtained by:
  moving the second pre-heating heat source along a third periphery of the first glass pane;
  turning the first glass pane 90 degree; and
  moving the second pre-heating heat source along a fourth periphery of the first glass pane.

In one or more examples, the first pre-heating heat source and the second pre-heating heat source are positioned in parallel and moves in parallel.

The above-described methods for pre-heating of the side seal material on the first glass pane, also applies to side seal material peripherally applied to the second glass pane.

The second pre-heating heat source will normally be identical to the first pre-heating heat source to ensure an even heating of the side seal material. Thus, the pre-heating heat source may comprise a second pre-heating heat source being a near-infrared or an infrared light source.

In one or more examples, the pre-heating heat source comprises a multiple of pre-heating heat sources each being a near-infrared or an infrared light source.

In one or more examples, the pre-heating temperature ($T_{PH}$) is at least 350 degrees Celsius, such as at least 400 degrees Celsius, such as at least 450 degrees Celsius.

In one or more examples, the pre-heating temperature ($T_{PH}$) is between 380-460 degrees Celsius, such as between 400-440 degrees Celsius, or such as between 410-430 degrees Celsius.

An advantage of using a high pre-heating temperature is that the side seal material vigorously foam and outgasses relative fast.

In one or more examples, the method further comprises heating at least the peripheral edge of the first glass pane to a pane temperature ($T_{Pane}$), wherein the pane temperature ($T_{Pane}$) is lower than the pre-heating temperature ($T_{PH}$). By heating the first glass pane, the side seal material spreads out and makes contact to adhere to the first glass pane.

In one or more examples, wherein the solidifying temperature ($T_S$) is lower than the pre-heating temperature ($T_{PH}$) by at least 5%, such as at least 10%, such as at least 20%.

In one or more examples, the pane temperature ($T_{Pane}$) is 80-120 degrees Celsius lower than the pre-heating temperature ($T_{PH}$), such as 100 degrees Celsius lower.

In one or more examples, the pane temperature ($T_{Pane}$) is between 200-400 degrees Celsius, such as between 250-380 degrees Celsius, such as between 280-360 degrees Celsius, such as between 300-340 degrees Celsius, or such as between 310-330 degrees Celsius.

In one or more examples, the side seal material comprises less than 1% solvent.

In one or more examples, the side seal material comprises less than 1% binder.

In one or more examples, the side seal material is a glass solder frit material.

In one or more examples, the side seal material is an amorphous glass solder material.

In one or more examples, the side seal material has a low melting glass component, wherein thermal treatment of the side seal material can be used to hermetically seal the periphery of the vacuum insulated glazing unit.

In one or more examples, the solder glass material component comprises at least one oxide selected from vanadium oxide, barium oxide, zinc oxide, bismuth oxide, aluminum oxide, silicon oxide, magnesium oxide, chromium oxide, iron oxide, cobalt oxide, sodium oxide, manganese oxide, tantalum oxide, molybdenum oxide, niobium oxide, tellurium oxide, or any combinations of one or more thereof.

In one or more examples, the side seal material comprises less than 0.1% lead.

In one or more examples, the method further comprises positioning the one or more spacers on the inner surface of the first glass pane either:
- prior to the positioning of the side seal material on the peripheral edge of the inner surface of the first glass pane, or
- after the positioning of the side seal material on the peripheral edge of the inner surface of the first glass pane, and prior to the pre-heating of the side seal material, or
- after pre-heating of the side seal material.

In one or more examples, the spacers comprise a metal, a ceramic, or a glass.

In one or more examples, the spacers have a height of 0.05 to 0.7 mm, or 0.1 to 0.4 mm, or 0.15 to 0.3 mm.

In one or more examples, the method further comprises positioning the one or more spacers on the inner surface of the second glass pane.

In one or more examples, the assembling the VIG unit comprises:
- paring the first glass pane and the second glass pane forming a paired glass pane unit where the first glass pane and the second glass pane are arranged with inner surfaces opposing each other;
- evacuating the void between the first glass pane and the second glass pane;
- sealing the paired glass pane unit.

In one or more examples, the dense side seal material has a height (h), wherein over the periphery of the first glass pane there are variations in the height (h) of the dense side seal material allowing for the evacuation of the void between the first glass pane and the second glass.

In one or more examples, the method further comprises cooling the dense side seal material to a solidifying temperature ($T_S$) prior to pairing the first glass pane and the second glass pane.

In one or more examples, the solidifying temperature ($T_S$) is lower than the pre-heating temperature ($T_{PH}$) by at least 20 degrees Celsius, such as by at least 30 degrees Celsius, such as by at least 40 degrees Celsius, such as by at least 60 degrees Celsius, such as by at least 80 degrees Celsius.

In one or more examples, cooling the dense side seal material to the solidifying temperature ($T_S$) is obtained by switching off the pre-heating heat source after the side seal material has outgassed and densified whereby the dense side seal material has been formed.

In one or more examples, the paring of the first glass pane and the second glass pane is conducted under pressure in a vacuum chamber.

In one or more examples, the pressure in the vacuum chamber is no higher than 0.001 mbar, such as no higher than 0.0005 mbar, such as no higher than 0.0001 mbar.

In one or more examples, the pressure in the sealed cavity between the two glass panes is no higher than 0.001 mbar, such as no higher than 0.0005 mbar, or such as higher than 0.0001 mbar.

In one or more examples, the paring of the first glass pane and the second glass pane is conducted in the same vacuum chamber as the pre-heating of the side seal material.

By the above is obtained that the side seal material can be outgassed in a vacuum chamber and result in a dense side seal material, which can subsequently be heated in a heating step in a vacuum chamber without foaming. This means that the pre-heating and the heating both can be done in a vacuum chamber, which significantly eases the production of VIG units.

Producing VIG units in vacuum chambers opens up for many possibilities e.g. that the previous need for a pump-out-port is eliminated. An efficient cleaning of surfaces e.g. by means of plasma, ozone, ultraviolet light is also facilitated. The need for a getter recess or activation of getter may also be eliminated.

In one or more examples, the sealing of the paired glass pane unit is obtained by heating at least the glass pane unit peripherally to a heating temperature ($T_H$). The entire glass pane may also be heated to the same heating temperature. Alternatively, the centre of the glass pane unit may be heated to a lower temperature than the periphery of the glass pane unit where the dense side seal material is positioned.

In one or more examples, wherein the heating temperature ($T_H$) is similar to the pre-heating temperature ($T_{PH}$).

In one or more examples, the temperature ($T_H$) is between 300-500 degrees Celsius, such as between 380-460 degrees Celsius, such as between 400-440 degrees Celsius, or such as between 410-430 degrees Celsius.

In one or more examples, the pressure in the sealed cavity between the two glass panes is reduced to a pressure of no higher than 0.001 mbar, such as no higher than 0.0005 mbar, or such as higher than 0.0001 mbar.

In one or more examples, the heating temperature ($T_H$) is maintained for at least 1 minutes, such as for at least 2 minutes, such as for at least 5 minutes.

In one or more examples, the heating temperature ($T_H$) is maintained for a period of time between 1 and 30 minutes, such as between 1 and 15 minutes, such as between 2 and 10 minutes, such as between 3 and 7 minutes or such as between 5 and 6 minutes.

In one or more examples, the first glass pane and the second glass pane are strengthened glass panes.

In one or more examples, the first glass pane and the second glass pane have been strengthened by thermal tempering, a plasma source, an ion source, or chemically strengthened.

In one or more examples, the first glass pane and the second glass pane have been strengthened by thermal tempering.

In one or more examples, the first glass pane has a thickness of between 1-6 mm, or between 2-5 mm, or between 2.5-4.5 mm.

In one or more examples, the second glass pane has a thickness of between 1-6 mm, or between 2-5 mm, or between 2.5-4.5 mm.

The thickness of the two glass panes may be the same, which allows for usage of the same production lines for producing the glass panes. The thickness of the two glass pane may alternatively by different if e.g. coating or similar is used on one of the panes. A thinner glass pane may also be used for one of the glass panes possibly reducing production costs.

In one or more examples, at least one of the glass panes are a soda lime silica glass or an alkali aluminosilicate glass.

In one or more examples, the inner surface of at least the first glass pane further comprises a low-emittance coating.

In one or more examples, the inner surfaces of both glass panes comprise a low-emittance coating.

In one or more examples, the window is for a fixed or ventilating window of a commercial building.

In one or more examples, the window is for a fixed or ventilating window of a residential building.

In one or more examples, the window is for a roof window or a skylight window.

In one or more examples, the window is for a vertical window application.

The above described and other features are exemplified by the following figures and detailed description.

Figure 1B:
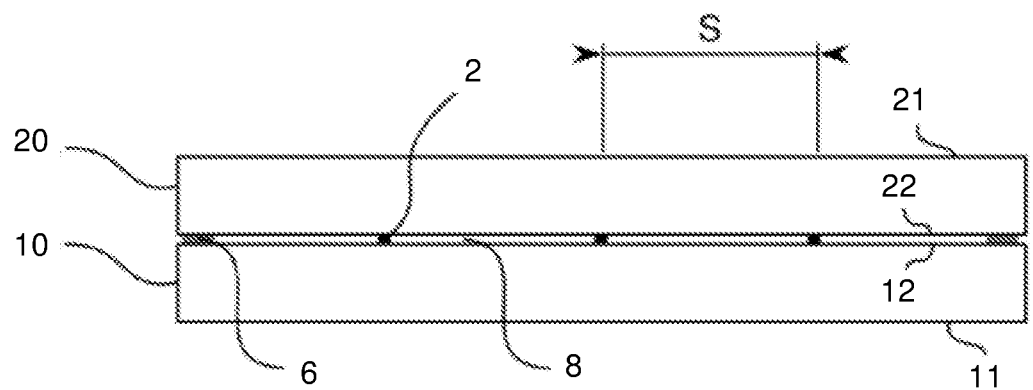
Figure 1C:
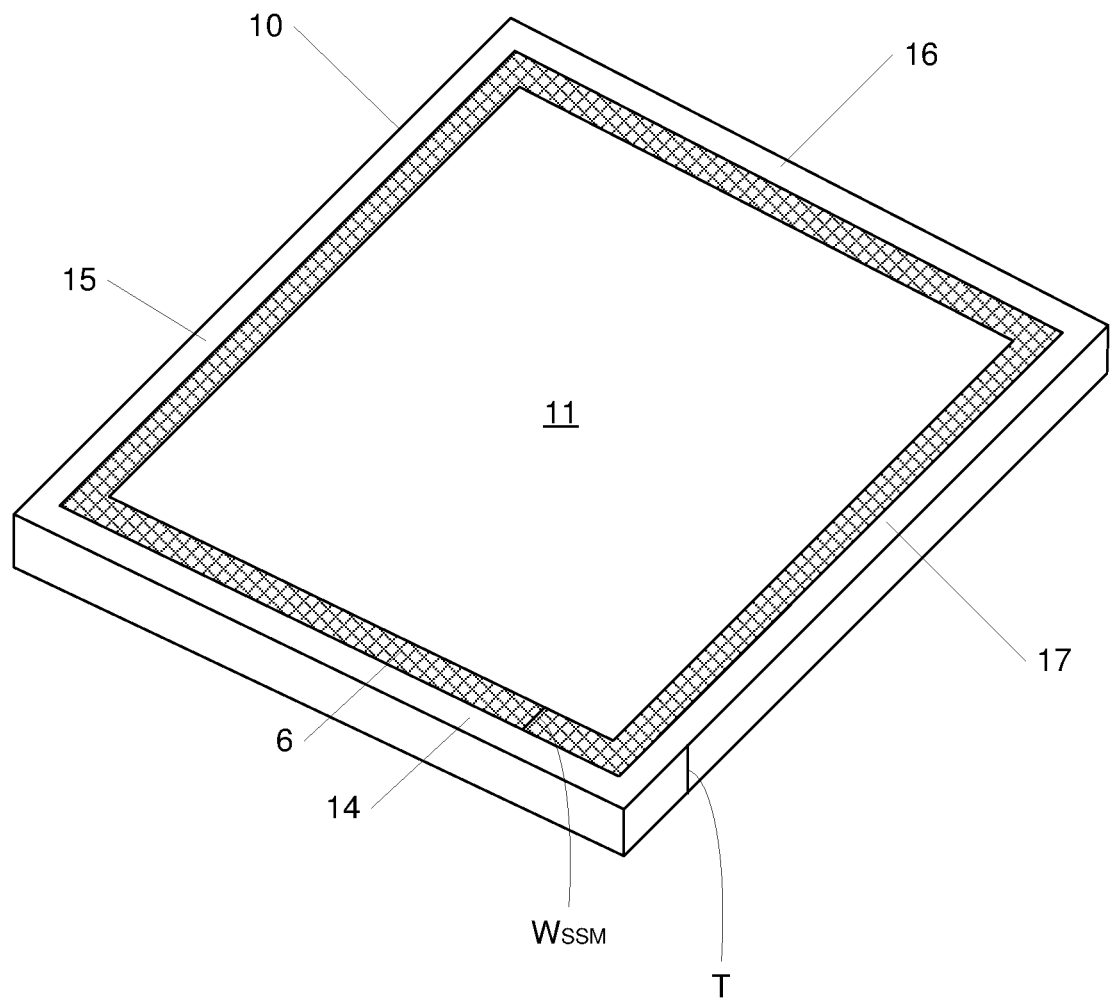

Referring to FIGS. 1A and 1B, an example of a vacuum insulated glazing (VIG) unit 1 is displayed in a top-down slightly sideward view and a side-ward view, respectively. The VIG unit comprises a first glass pane 10 and a second glass pane 20 arranged in parallel. The first glass pane 10 has an outer surface 11 and an inner surface 12. Likewise, the second glass pane 20 has an outer surface 21 and an inner surface 22. The two inner surfaces 12, 22 are opposing each other. The naming of the surfaces inner and outer surface thus are merely a denotation of the positing of the tempered glass panes in the VIG unit. The surfaces may be similar in terms of surface structure and material.

The first glass pane 10 and the second glass pane 20 each has a thickness T defined by the distance between the inner surface 12, 22 and the outer surface 11, 21 of the glass panes. The thickness of the two glass panes may be the same, which allows for usage of the same production lines for producing the glass panes. The thickness of the two glass pane may alternatively by different if e.g. coating or similar is used on one of the panes. A thinner glass pane may also be used for one of the glass panes possibly reducing production costs. The thickness of the glass panes may be between 1-6 mm, or between 2-5 mm, or between 2.5-4.5 mm.

The glass panes are normally substantially transparent to visible light (i.e. at least about 50% transparent, more preferably at least about 70% transparent, more preferably at least about 80% transparent, and most preferably at least about 90% transparent), although they may be tinted in some examples.

Any suitable glass from which glass panes can be obtained may be used for the glass panes 10, 20. Examples include a soda lime silica glass and an alkali aluminosilicate glass.

Between the opposed inner surfaces 12, 22 of the two glass panes 10, 20 are arranged spacers 2. By spacers are meant any type of material, which may be used for preventing sagging and contact between adjacent glass panes 10, 20. The spacers 2 provide, and thus define the distance of, the void/gap 8 between the inner surfaces 12, 22 of the glass panes 10, 20. The spacers 2 may be integral or adhered to the inner surfaces of the glass panes. The spacers 2 may alternatively be discrete and held in position by atmospheric pressure on the outer surfaces 11, 21 of the glass panes 10, 20.

An example of spacers are the pillars as shown in FIGS. 1*a* and 1*b*. However, the spacers may have any suitable shape, for example spherical, cylindrical, square, rectangular, rod-like, bead-like, oval, trapezoidal, or the like.

The spacers 2 can be arranged in an array separated by a distance S between adjacent spacers. The distance between spacers, or the spacer-to-spacer distance between each adjacent spacer, may be between 20 to 120 mm, such as e.g. 25 to 80 mm, or 30 to 60 mm. The distance between spacers may be measured from an outer edges of adjacent spacers. Alternatively, the distance between spacers may be measured from the centers of adjacent spacers. The spacer-to-spacer distance can be the same or different between each adjacent spacer. Using the same spacer-to-spacer distance may simplify the process of positioning the spacers on one of the glass panes as the same settings can be used in the tool, which places the spacers. Using a different spacer-to-spacer distance may create a VIG unit where the user less easily notices the spacers when looking out the window into which the VIG unit has been inserted as the eye often pays less attention to an uneven and random positioning of spacers compared to an even-structured positioning. Greater distances between spacers can increase the compressive load on each spacer and can cause a VIG unit to lose vacuum due to stress and cracks. A denser positioning of the spacers may therefore be used in specific region to increase the robustness of the VIG unit.

The spacers may have a height of 0.05 to 0.7 mm, such as between 0.1 to 0.4 mm, or between 0.15 to 0.3 mm. In one or more examples, the spacers have the same height. This keeps the production cost low as only one type of spacer is needed.

The tool used for positioning the spacers on the glass pane will further not need to have individual settings for placing spacers with a difference in height.

The spacers may alternatively have the different heights, including at least two different heights. As the distance between the two glass panes may vary from region to region in VIG unit, a difference in height of the spacers will allow for compensation of these distance variations. In one or more examples, each spacer independently has a height of 0.05 to 0.7 mm, preferably 0.1 to 0.4 mm, more preferably 0.15 to 0.3 mm.

The spacers may have a width of between 0.1 to 1 mm, or between 0.2 to 0.8 mm, such as between 0.3 to 0.7 mm. Again the width of the individual spacers may be the same or may be different.

The spacer can be any suitable material, for example solder glass, a polymer (e.g., Teflon), plastic, ceramic, glass, metal, or the like. In one or more examples, the spacer comprises a steel or a solder glass.

The spacer can include a surface coating that is disposed on the outer surface of the spacer to reduce cracks in the glass panes and reduce scratches when the glass panes flex and move. Any suitable surface coating may be used, for example a surface coating that comprises a low coefficient of friction (e.g., has a lower coefficient of friction than the spacer material). The surface coating can include tungsten disulfide ($WS_2$), molybdenum disulfide ($MoS_2$), tungsten diselenide ($WSe_2$), molybdenum diselenide ($MoSe_2$), or a combination thereof. In some examples, the surface coating is disposed on the top and/or bottom of the spacer. As used herein, "top" and "bottom" of the spacer means the portions of the spacer configured to contact the glass pane, for example that contact the spacer contact regions of the glass pane. In one or more examples, the surface coating is in contact with the inner surface of at least one of the glass panes.

A side seal material 6 is peripherally arranged between the first glass pane 10 and the second glass pane 20 creating an internal void/gap 8 between the glass panes. Thus, the side seal material 6 is attached around the periphery of the first glass pane 10 and the second glass pane 20 and forms a sealed cavity 8 between the glass panes 10, 20.

Any suitable side seal material known in the industry can be used.

The side seal material can be a soldering material, for example a glass solder frit material. The glass solder frit material may have a low melting temperature, wherein thermal treatment can be used to hermetically seal the periphery of the VIG unit.

In an example, the frit material includes vanadium oxide, barium oxide, zinc oxide, bismuth oxide, aluminum oxide, silicon oxide, magnesium oxide, chromium oxide, iron oxide, cobalt oxide, sodium oxide, manganese oxide, tantalum oxide, molybdenum oxide, niobium oxide, tellurium oxide, or a combination thereof. The soldering material may be provided as a combination of two different materials comprising glass solder frit with different thermal expansion coefficients that are adjusted to correspond to the thermal expansion coefficients of the bonded parts. Also several solder materials may allow pre-sintering of a first solder to the glass surface and subsequently use of a second solder to join to the first solder.

In one or more examples, the side seal material may be a lead free solder glass material. In one or more examples, the side seal material comprises less than 0.1% lead. For example, side seal material may be a vanadium-tellurium oxide solder glass material.

In one or more embodiments, the low melting point solder glass material comprising the following ingredients: tellurium dioxide, divanadium pentaoxide, aluminium oxide in glasses/pigments and manganese dioxide. The concentrations of the ingredient may be 30-50% tellurium dioxide, 20-30% divanadium pentaoxide, 5-10% aluminium oxide in glasses/pigments and 1-5% manganese dioxide.

In one or more examples, the glass material in the side seal material may be a glass powder material, such as an amorphous glass powder material, that is heated and melted by means of a heating arrangement before it is applied. Thus, the side seal material may be an amorphous glass solder material.

The VIG unit 1 may be produced by a method including a pre-heating method, which is used for efficiently outgassing of the side seal material prior to sealing the two glass panes 10, 20. The pre-heating method 100 drastically reduces foaming of the side seal material during the subsequent process of sealing the two glass panes 10, 20 and evacuating the void 8 between the sealed panes.

The pre-heating method 100 is shown in FIGS. 2A-D is and comprises a) providing the first glass pane 102, b) positioning a side seal material on the peripheral edge of the inner surface of the first glass pane 104, c) pre-heating the side seal material to a pre-heating temperature ($T_{PH}$) using a pre-heating heat source 106. During the pre-heating 106, the side seal material first foams as gaseous inclusions formed in the side seal material outgasses. After the gaseous inclusions has outgassed from the side seal materiel, the side seal densifies to form a dense side seal material.

Figure 3:
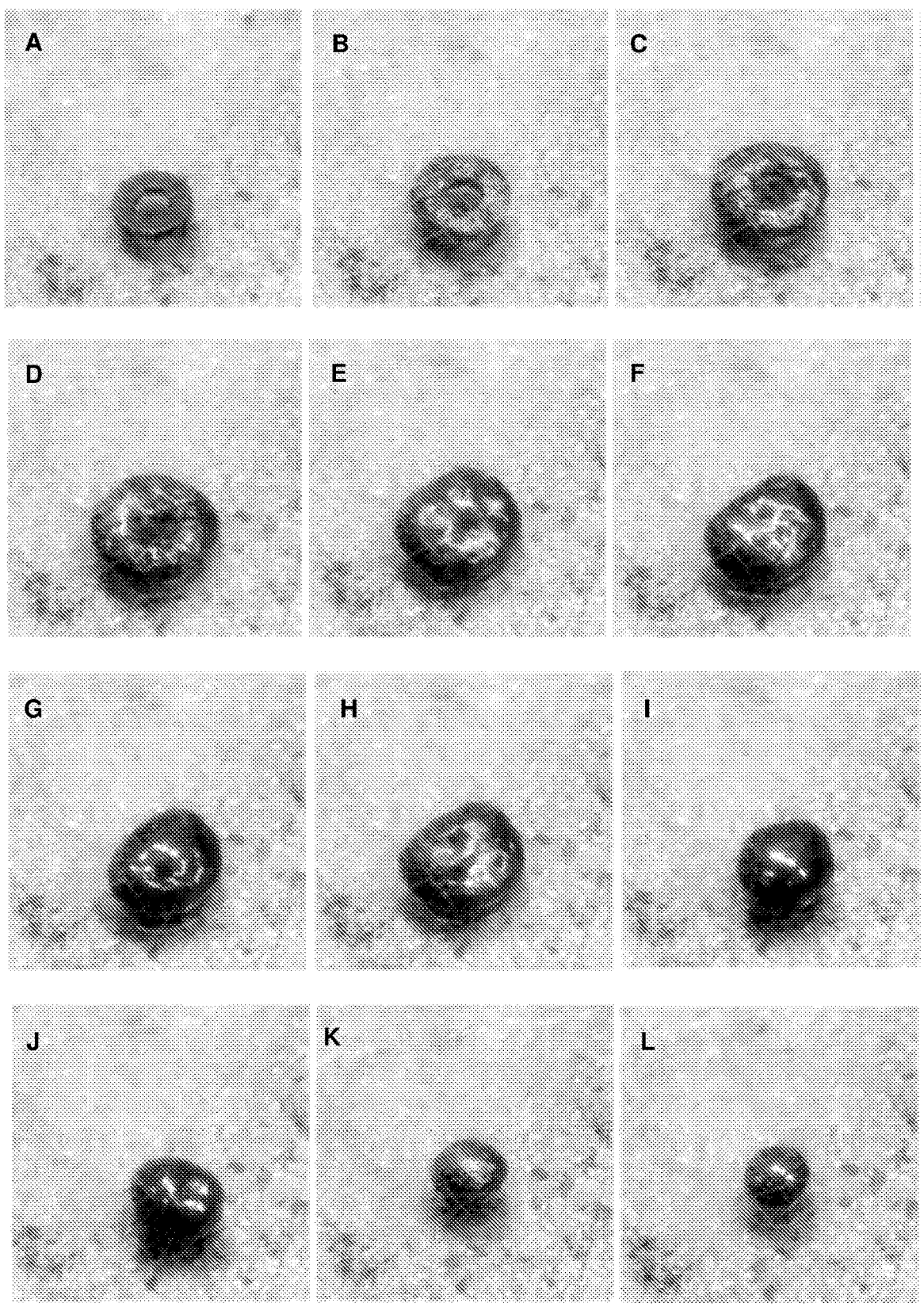
FIG. 3 shows the process of pre-heating a side seal material to form a dense and outgasses side seal material.

Referring the FIG. 3, the process 106 of pre-heating a piece of side seal material to form a dense and outgasses side seal material is shown in the 12 images. The side seal material in FIG. 3A is the side seal material prior to heating of the side seal material to $T_{PH}$. In FIGS. 3B to 3E, the vigorous foaming of the side seal material due to outgassing of the gaseous inclusions can be seen as the side seal material is heating to $T_{PH}$. The outgassing continues as shown in the FIGS. 3E to 3H from whereon the side seal material gradually starts to densify as shown in FIGS. 3H to 3L as the gaseous inclusion outgasses. The dense side seal material, which has been outgassed, is shown in FIG. 3L. When the dense side seal material shown in FIG. 3L is allowed to solidify, and subsequently re-heating, no or nearly no outgassing or foaming is observed in the side seal material.

The process of pre-heating the side seal material 106 to form the dense side seal material where gaseous inclusions from the side seal material has outgasses may take less than 5 minutes, such as less than 2 minutes, such as less than 1 minute, such as less than 30 seconds at locations where the pre-heating heat source is heating the side seal material. The image shown in FIG. 3L is obtained less than 30 seconds after the image in FIG. 3A is obtained.

If the pre-heating heat source is not covering the entire side seal material, which would be the case if a laser is used, the pre-heating heat source needs to be moved relatively to the side seal material in order to heat the entire side seal material. By locations where the pre-heating heat source is heating the side seal material is therefore meant the positions which received light from e.g. a laser or another heat source not heating the entire side seal material at once.

The process of pre-heating the side seal material 106 to form the dense side seal material where gaseous inclusions from the side seal material has outgasses may take 3-10 minutes, such as 4-6 minutes when all of the side seal material is heated with the pre-heating heat source simultaneously.

The images shown in FIGS. 3A-L are obtained under reduced pressure in a vacuum chamber. Normally, the pressure in the vacuum chamber is no higher than 0.5 mbar, such as no higher than 0.1 mbar, such as no higher than 0.05 mbar, such as no higher than 0.01 mbar, such as no higher than 0.005 mbar, such as no higher than 0.001 mbar, such as no higher than 0.0005 mbar, such as no higher than 0.0001 mbar.

Alternatively, the pre-heating can be done at atmospheric pressure. The outgassing will normally be slower if the pre-heating and outgassing is performed under atmospheric pressure.

As seen when comparing the images in FIG. 3, the bulk density defined as the mass per volume, decreases during the outgassing process. This is seen clearly when comparing the images in FIG. 3A and FIGS. 3E-H, which shows that the side seal material has an initial side seal density prior to being pre-heated, and a foaming side seal density during foaming of the side seal material, wherein the initial side seal density is larger than the foaming side seal density.

The initial side seal density is larger than the foaming side seal density by at least 50%, such as at least 60%, such as at least 70%, such as at least 80%, such as at least 90%, such as at least 100%, such as at least 120%, such as at least 150%, such as at least 175%, such as at least 200%, such as at least 250%, such as at least 300%, such as at least 350%, such as at least 400%.

When comparing the images in FIGS. 3E-H with that in FIG. 3L, it is clear that the density increases as the outgassing approaches completion and the dense side seal material is obtained. The density of the dense side seal material may be larger than the foaming side seal density by at least 50%, such as at least 60%, such as at least 70%, such as at least 80%, such as at least 90%, such as at least 100%, such as at least 120%, such as at least 150%, such as at least 175%, such as at least 200%, such as at least 250%, such as at least 300%, such as at least 350%, such as at least 400%.

The pre-heating heat source used for pre-heating the side seal material in 106 in FIGS. 2A-D may be directing the majority of the heat at the side sealing materiel. This ensures an efficient use of the energy.

Different pre-heating heat sources may be applied. In one or more examples, the pre-heating heat source comprises at least a first pre-heating heat source being a near-infrared or an infrared light source. By near-infrared (NIR) is meant light in the wavelength range between 750 nm-1.400 nm (0.75-1.4 µm) and by infrared (IR) is meant light in the wavelength range between 750 nm-15.000 nm (0.75-15 µm).

The near-infrared or infrared light source may be a laser such as a continuous wave laser or a pulsed laser emitting light in the near-infrared or infrared wavelength range. An example of such a laser is a 980 nm diode laser.

Referring now to FIG. 10, a first glass pane 10 is shown with a side seal material 6 peripherally arranged around the periphery on the inner surface 11 of the first glass pane 10. The width $w_{SSM}$ of side seal material is marked in FIG. 10. Normally, when a laser is used, the laser light irradiates the side seal material with light having a spot size being at least 10% larger than the width $w_{SSM}$ of the side seal material. In this manner, it is ensured that the side seal material is heated evenly across the width of the material. If an NIR/IR lamp is used, it will also be ensured that the width of the NIR/IR light exceeds that of the side seal material 6.

To ensure that the laser beam spot size is larger than the width of the side seal material $w_{SSM}$, the laser may be de-focussed and possibly collimated to have a larger spot size than that of the light being emitted from the laser.

In one or more examples, $w_{SSM}$ is between 5-10 mm and the spot size of the laser light is between 10-20 mm in diameter.

When pre-heating of the side seal material, the pre-heating heat source needs to move to cover either the entire side seal material or the first glass pane 10 needs to move. Raster scanning may be one manner of moving a laser being the pre-heating heat source.

Thus, the pre-heating of the side seal material may be obtained by moving the first pre-heating heat source around the peripheral edge of the inner surface of the first glass pane. Alternatively, the pre-heating of the side seal material may be obtained by moving the first glass pane relative to the first pre-heating heat source.

A combination may also be used, wherein the pre-heating of the side seal material 6 is obtained by:
 moving the first pre-heating heat source along a first periphery 14 of the first glass pane 10;
 turning the first glass pane 90 degrees; and
 moving the first pre-heating heat source along a second periphery 15 of the first glass pane 10.

In order to pre-heat the side seal material 6 on the third periphery 16 and the fourth periphery 17 of the first glass 10, the following may be done:
 turning the first glass pane 90 degrees;
 moving the first pre-heating heat source along a third periphery 16 of the first glass pane 10;
 turning the first glass pane 90 degrees; and
 moving the first pre-heating heat source along a fourth periphery 17 of the first glass pane 10.

The first, second, third and fourth periphery of the first glass pane 10 are marked in FIG. 10, where it can be seen that the first periphery 14 is opposite of the third periphery 16 and the second periphery 15 is opposite of the fourth periphery 17.

As an alternative to turning the first glass pane 10 three times and moving the laser to pre-heat each periphery separately, two pre-heating heat sources may be used.

The second pre-heating heat source will normally be identical to the first pre-heating heat source to ensure an even heating of the side seal material. Thus, the pre-heating heat source may comprise a second pre-heating heat source being a near-infrared or an infrared light source.

When using two pre-heating heat sources, the pre-heating of the side seal material arranged on the third and fourth periphery of the first glass pane, will normally be pre-heated by:
 moving the second pre-heating heat source along the third periphery 16 of the first glass pane;
 turning the first glass pane 90 degree; and
 moving the second pre-heating heat source along the fourth periphery 17 of the first glass pane.

To have an efficient pre-heating process, the first pre-heating heat source and the second pre-heating heat source may be positioned in parallel and may move in parallel.

When pre-heating, the side seal material is heated to a temperature where the material melts. In one or more examples, the pre-heating temperature ($T_{PH}$) is at least 350 degrees Celsius, such as at least 400 degrees Celsius, such as at least 450 degrees Celsius. In one or more examples, the pre-heating temperature ($T_{PH}$) is between 380-460 degrees Celsius, such as between 400-440 degrees Celsius, or such as between 410-430 degrees Celsius.

If the temperature of the periphery of the first glass pane are significantly lower than that of the side seal material, the side seal material may are problem adhering to the first glass pane. In order to avoid this problem, at least the peripheral edge of the first glass pane may be heated to a pane temperature ($T_{Pane}$), wherein the pane temperature ($T_{Pane}$) is lower than the pre-heating temperature ($T_{PH}$).

In one or more examples, the pane temperature ($T_{Pane}$) is 80-120 degrees Celsius lower than the pre-heating temperature ($T_{PH}$), such as 100 degrees Celsius lower. Thus, the pane temperature ($T_{Pane}$) may be between 200-400 degrees Celsius, such as between 250-380 degrees Celsius, such as between 280-360 degrees Celsius, such as between 300-340 degrees Celsius, or such as between 310-330 degrees Celsius.

The method for producing the VIG unit may further comprise positioning the one or more spacers 2. The spacers 2 may be positioned between the glass panes 10, 20 in some different manners.

Figure 2A:
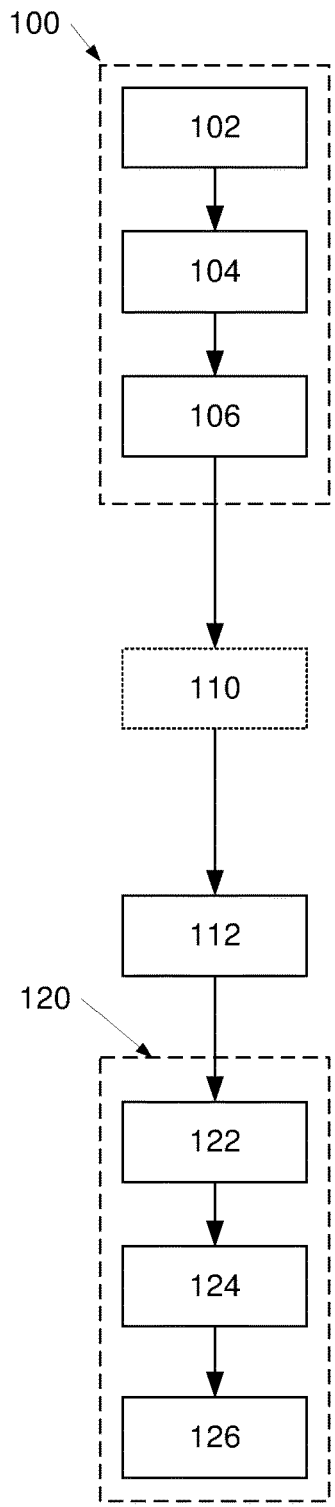
FIGS. 2A-E show flow diagrams of different VIG unit production methods.

In FIG. 2A is shown an example, where the spacers 2 are positioned on the inner surface of the first glass pane in 112 after pre-heating of the side seal material in 106.

Figure 2B:
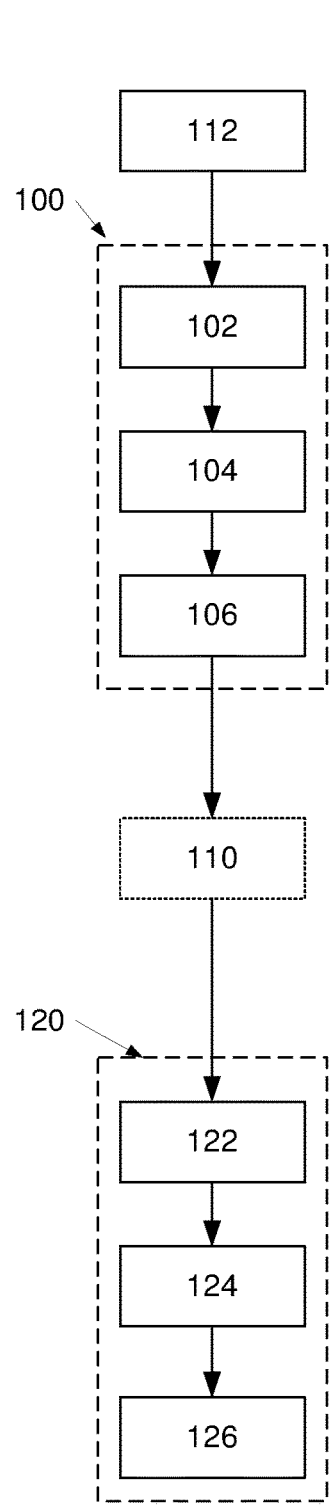

In FIG. 2B is shown an example, where the spacers 2 are positioned on the inner surface of the first glass pane in 112 prior to the positioning of the side seal material on the peripheral edge of the inner surface of the first glass pane in 102.

Figure 2C:
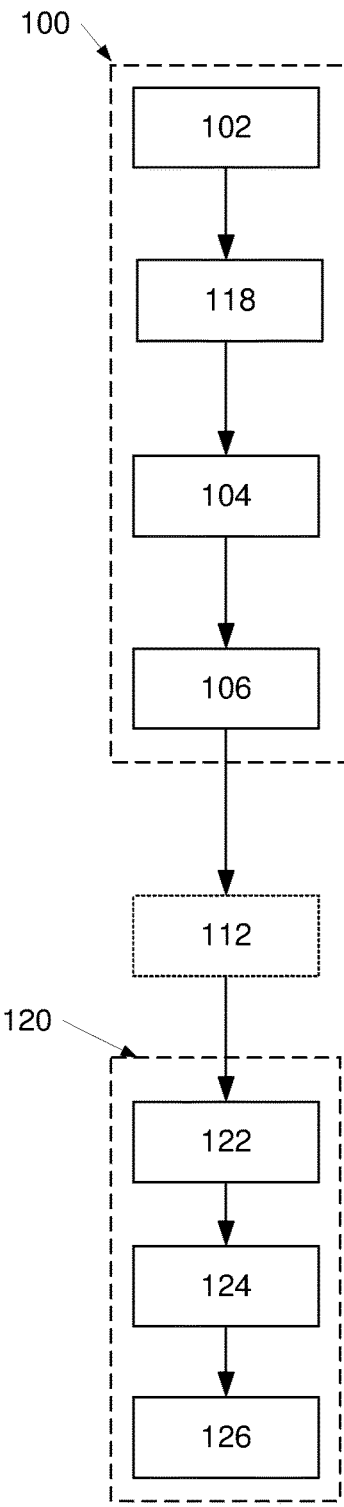

In FIG. 2C is shown an example, where the spacers 2 are positioned on the inner surface of the first glass pane in 112 after the positioning of the side seal material on the peripheral edge of the inner surface of the first glass pane in 104, and prior to the pre-heating of the side seal material in 106.

Figure 2D:
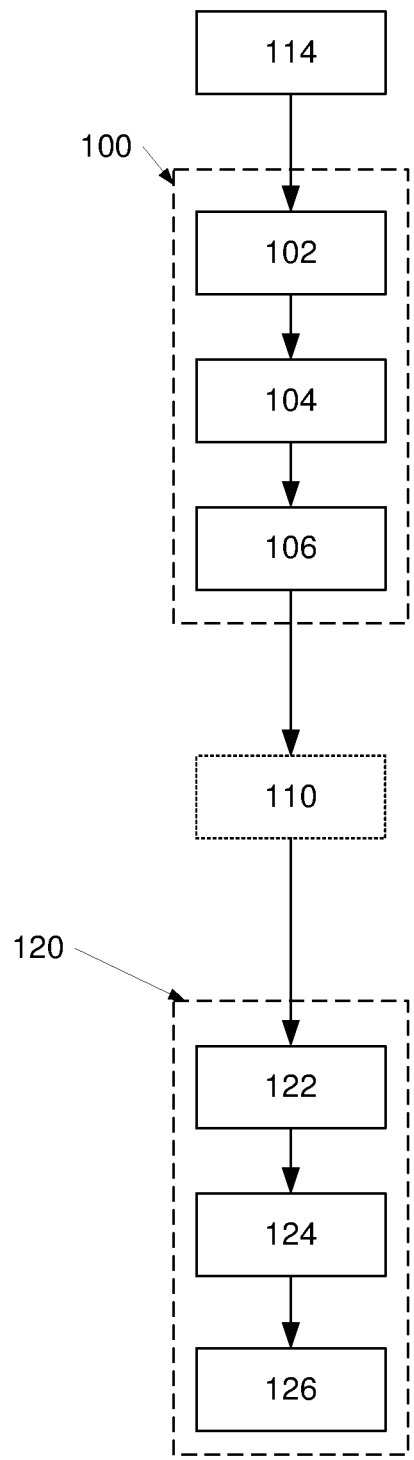

In FIG. 2D is shown an example, where the spacers 2 are positioned on the inner surface of the second glass pane in 114. In this example, the side seal material 6 will still be applied to the first glass pane 10.

In FIGS. 2A-D, is further shown the assembling of the two glass panes in 120 after the pre-heating of the side seal material is completed. The method for producing a VIG unit may therefore also include paring the first glass pane 10 and the second glass pane 20 in 122 thereby forming a paired glass pane unit where the first glass pane 10 and the second glass pane 20 are arranged with inner surfaces 11, 22 opposing each other.

Figure 2E:
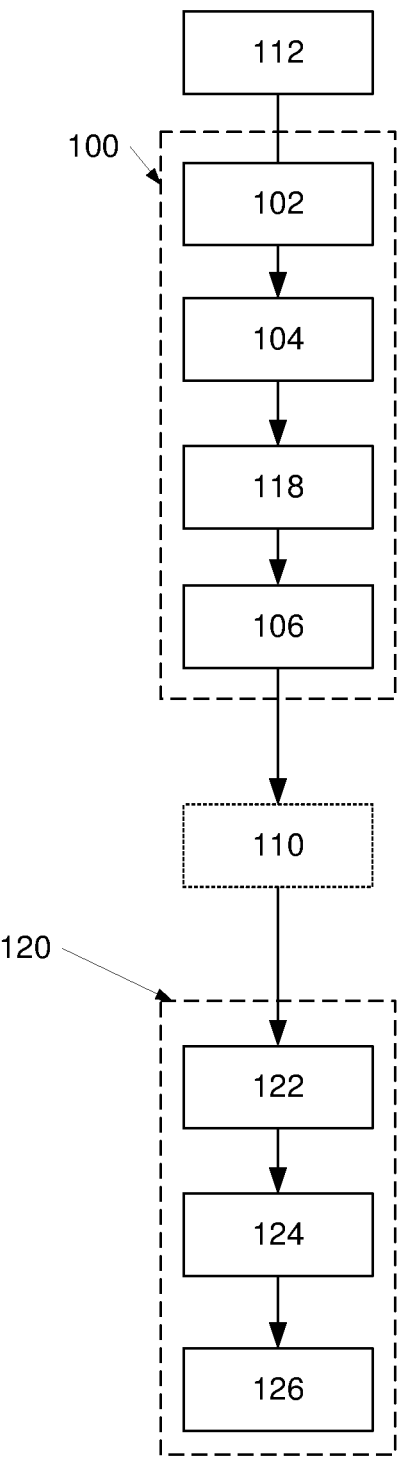

Referring now to FIG. 2E, a method is shown include pre-paring of the panes in 118, where the first glass pane 10 and the second glass pane 20 are brought close together before the side seal material is pre-heated. In the semi-parred configuration, the second glass pane 20 is positioned at a distance above the first glass pane 10 with spacers 2 and side seal material 6 positioned thereon. The distance between the second glass pane and the side seal material is large enough to allow for the side seal material to efficiently outgas.

After the first glass pane 10 and the second glass pane 20 have been paired, the void 8 between the first glass pane 10 and the second glass pane 20 are evacuated in 124 and the paired glass pane unit is sealed in 126.

In FIGS. 2A-E is shown a cooling of the dense side seal material to a solidifying temperature ($T_S$) prior to pairing the first glass pane 10 and the second glass pane 20 in 110. This step is optional and may be omitted.

The solidifying temperature ($T_S$) may be lower than the pre-heating temperature ($T_{PH}$) by at least 20 degrees Celsius, such as by at least 30 degrees Celsius, such as by at least 40 degrees Celsius, such as by at least 60 degrees Celsius, such as by at least 80 degrees Celsius.

The cooling of the dense side seal material to the solidifying temperature ($T_S$) may be obtained by switching off the pre-heating heat source after the dense side seal material 4 has formed.

Figure 4A:
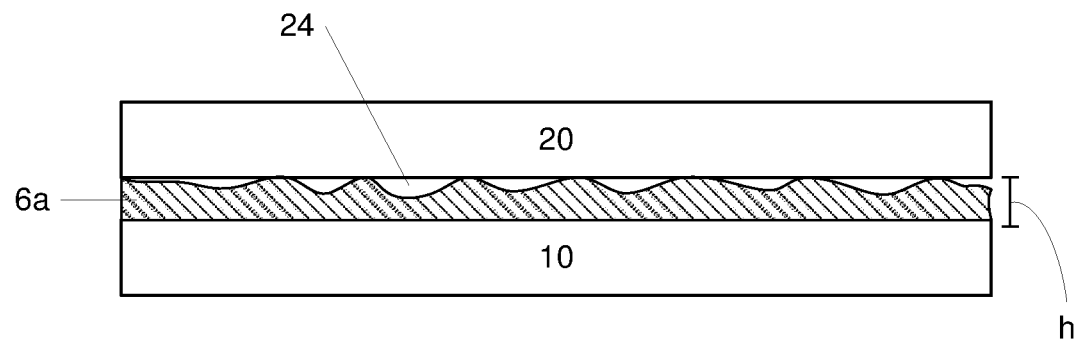
FIG. 4A shows a cross sectional side view of a VIG unit prior to sealing the two glass panes and FIG. 4B shows the VIG unit after sealing of the two panes.
Figure 4B:
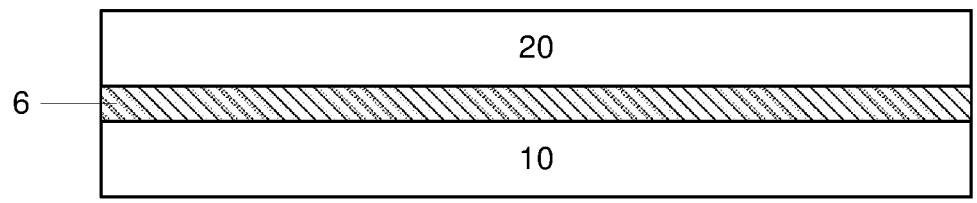

The dense side seal material 6a has a height h as shown in FIG. 4A being a cross sectional side view showing the two glass panes 10, 20 after pairing but before sealing the glass panes. The height of the dense side seal material 6a prior to sealing the glass panes 10, 20, variations over the periphery of the first glass pane 10. This allows for an evacuation of the void 8 between the first glass pane 10 and the second glass 20, as small gaps 24 between the dense side seal material and the second glass pane are forming upon paring of the glass panes 10, 20. The small gaps 24 disappears upon heating the dense side seal material 6a in when sealing the VIG unit whereby the sealing VIG unit shown in FIG. 4B is obtained forming the side seal material 6 sealing the two glass panes 10, 20 together.

The paring of the first glass pane 10 and the second glass pane 20 may be conducted under pressure in a vacuum chamber. In one or more examples, the pressure in the vacuum chamber is no higher than 0.001 mbar, such as no higher than 0.0005 mbar, such as no higher than 0.0001 mbar.

In one or more examples, the paring of the first glass pane and the second glass pane is conducted in the same vacuum chamber as the pre-heating of the side seal material. This eliminates the need for two vacuum chambers.

The sealing of the paired glass pane unit in 126 in FIGS. 2A-D may be obtained by heating the glass pane unit to a heating temperature ($T_H$). In one or more examples, the temperature ($T_H$) is between 300-500 degrees Celsius, such as between 380-460 degrees Celsius, such as between 400-440 degrees Celsius, or such as between 410-430 degrees Celsius.

In one or more examples, the pressure in the sealed cavity between the two glass panes is reduced to a pressure of no higher than 0.001 mbar, such as no higher than 0.0005 mbar, or such as higher than 0.0001 mbar.

In one or more examples, the heating temperature ($T_H$) is maintained for a period of time between 3 and 60 minutes, such as between 25 and 50 minutes, such as between 35 and 45 minutes, such as between 10 and 30 minutes or such as between 10 and 20 minutes.

In one or more examples, the heating temperature ($T_H$) is maintained for at least 10 minutes, such as for at least 25 minutes, such as for at least 35 minutes.

Figure 6A:
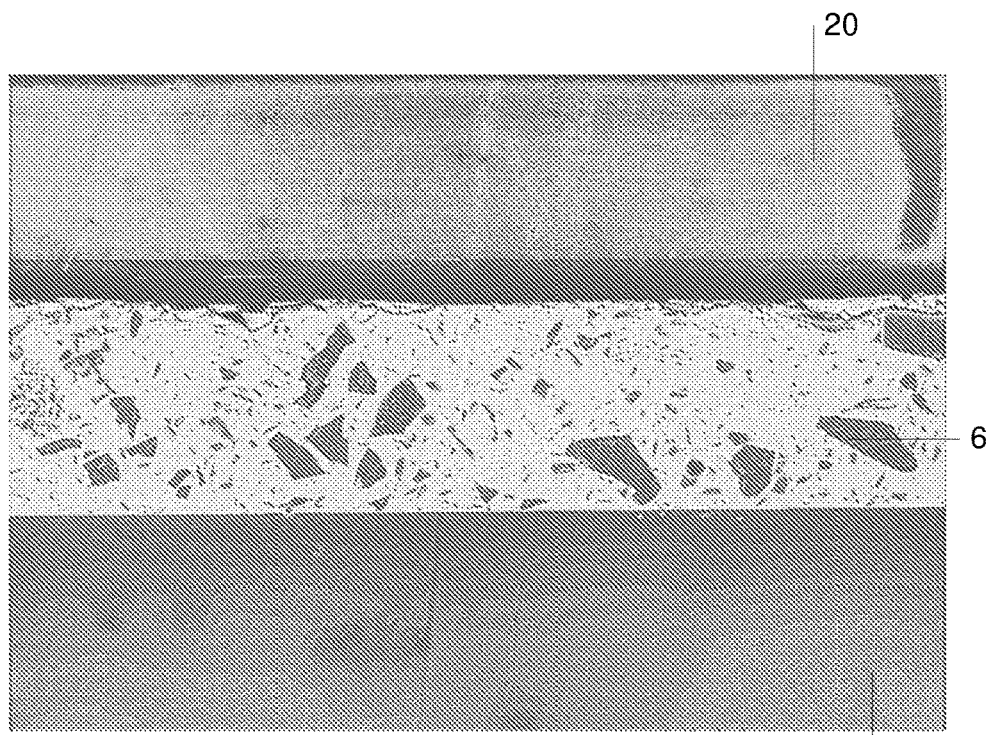
FIG. 6A show a cross sectional SEM image of side seal material in a VIG unit produced by the method as disclosed herein and FIG. 6B is a contrast image of the SEM image in FIG. 6A.
Figure 6B:
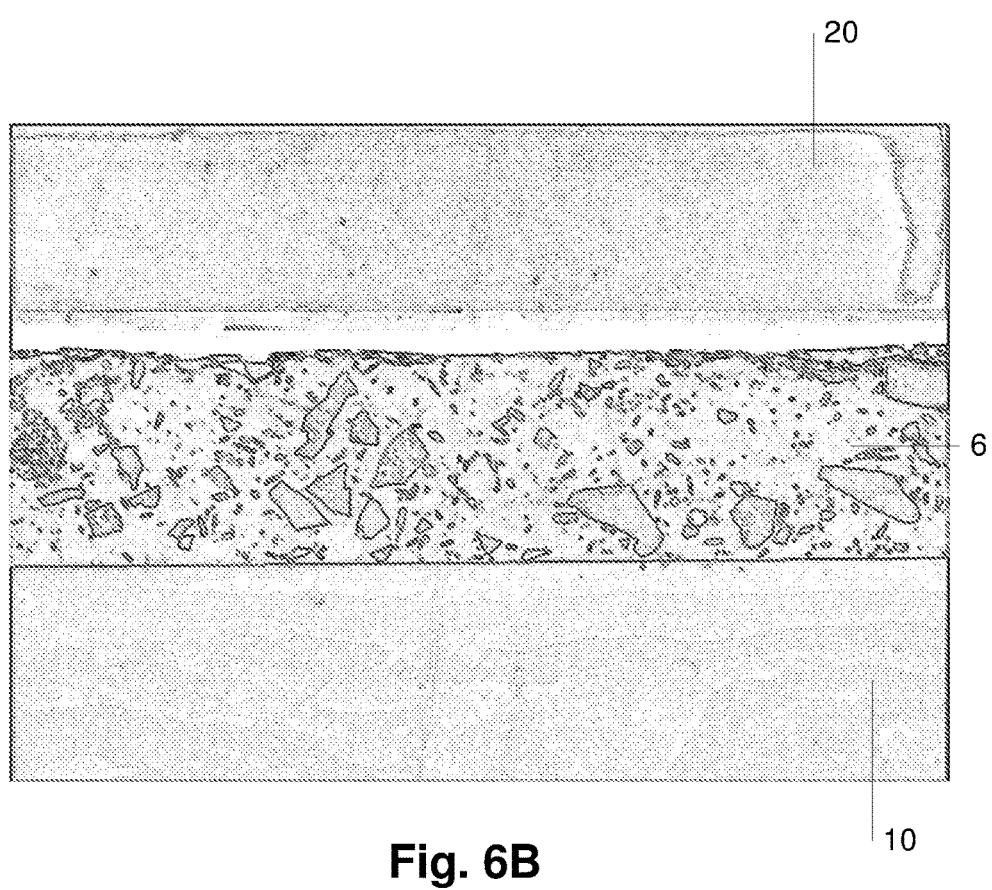

Referring now to FIGS. 5A-B in comparison to FIGS. 6A-B, the effect of pre-heating the side seal material prior to sealing the panes together can be seen clearly. FIG. 5A shows a SEM images of an assembled and sealed VIG unit produced by a method not having the pre-heating of the side seal material included and FIG. 6A shows the SEM image of an assembled and sealed VIG unit where pre-heating of the side seal material as described herein has be implemented. The B-figures are contrast images produced to provide a better view of the difference in the side seal material in the SEM images in the A-figures.

It is very clear to see that gaseous inclusions 30 are present in the side seal material 6 when using the sealing method where the side seal material has not been preheated prior to the sealing of the panes 10, 20 as shown in FIGS. 5A-B. When comparing to the images shown in FIGS. 6A-B, nearly no gaseous inclusions are observable. This corresponds well to the observation that nearly no additional outgassing is observed when sealing the glass panes 10, 20 if the side seal material has been pre-heated as described herein.

The gaseous inclusions in the dense side seal material constitutes less than 15% of a total volume of the dense side seal material, such as less than 10% of the total volume, such as less than 5% of the total volume, such as less than 1% of the total volume.

The glass panes 10, 20 may be strengthened glass panes to increase strength. The glass panes 10, 20 may be strengthened by thermal tempering, a plasma source, an ion source, or chemically strengthened. The term "tempered glass pane" as used herein is understood to mean glass panes in which compressive stresses have been introduced in the surface(s) of the glass pane. For glass to be considered strengthened this compressive stress on the surface(s) of the glass can be a minimum of 69 MPa (10,000 psi) and may be higher than 100 MPa. The VIG is heated during production in order to form the periphery seal etc. and some glass strength may be annealed or lost during manufacture.

In one or more examples, the tempered glass panes have been tempered by thermal tempering, chemical tempering, plasma tempering, or a combination comprising at least one of the foregoing.

Tempered glass, also known as toughened glass, may be produced from annealed glass by means of a strengthening procedure, which e.g. may be thermal tempering, chemical tempering, or plasma tempering with the purpose of introducing the compressive stresses into the surface(s) of the glass pane. After tempering, the stress developed by the glass can be high, and the mechanical strength of tempered glass can be four to five times greater than that of annealed glass.

The tempered glass panes may have been tempered by thermal tempering. Thermally tempered glass may be produced by means of a furnace in which an annealed glass pane is heated to a temperature of approximately 600-700° C., after which the glass pane is rapidly cooled. The cooling introduces the compressive stresses into the glass pane surface(s).

A chemical tempering process involves chemical ion exchange of at least some of the sodium ions in the glass pane surface with potassium ions by immersion of the glass pane into a bath of liquid potassium salt, such as potassium nitrate. The potassium ions are about 30% larger in size than the replaced sodium ions, which causes the material at the glass pane surfaces to be in a compressed state. In this process, typically by immersion of the glass sheet into a molten salt bath for a predetermined period of time, ions at or near the surface of the glass sheet are exchanged for larger metal ions from the salt bath. The temperature of the molten salt bath is typically about 400-500° C. and the predetermined time period can range from about two to ten hours.

The incorporation of the larger ions into the glass strengthens the sheet by creating a compressive stress in a near surface region. A corresponding tensile stress is induced within a central region of the glass to balance the compressive stress.

Plasma tempering of glass panes resembles the chemical tempering process in that sodium ions in the surface layers of the glass pane are replaced with other alkali metal ions so as to induce surface compressive stresses in the glass pane, the replacement is however made by means of plasma containing the replacement ions. Such method may be conducted by using a plasma source and first and second electrodes disposed on opposing major surfaces of a glass pane, wherein the plasma comprises replacement ions, such as potassium, lithium, or magnesium ions, whereby the replacement ions are driven into the opposing surfaces of the glass pane so as to increase the strength of the pane.

The glass panes may also include a low-emittance or low-emissivity (low-E) surface coating. In one or more examples, the inner surface of at least the first glass pane further comprises a low-emittance coating. Alternatively, the inner surfaces of both glass panes comprise a low-emittance coating. Any suitable low-E coating may be used. For example, the inner surfaces of the first and second glass panes can each have the same or different low-emittance coatings. Low-E coating may comprise several layers, including silver layer(s). Low-E coatings may include a layer of an infrared-reflecting film and one or more optional layers of a transparent dielectric film. The infrared-reflecting film, which may include a conductive metal such as silver, gold, or copper, reduces the transmission of heat through the coated pane. A dielectric film may be used to anti-reflect the infrared-reflecting film and to control other properties and characteristics of the coating, such as colour and durability. Commonly used dielectric materials include oxides of zinc, tin, indium, bismuth, and titanium, among others.

Example low-E coatings include one or two silver layers each sandwiched between two layers of a transparent dielectric film. Increasing the number of silver layers can increase the total infrared reflection, although additional silver layers can also reduce the visible transmission through the window and/or negatively impact the coating's colour or durability. In one or more examples, the low-E coating comprises multiple layers including a layer of $Si_3N_4$. The low-E coating in contact with the spacer can affect the way the spacer interfaces with the inner surface of the glass pane and reduce the risk of cracking in the glass.

In one or more examples, the low-E coating has a thickness of 1 to 500 nm, such as 10 to 400 nm, or such as 20 to 300 nm, or such as 50 to 250 nm.

Optical coatings may be applied using a suitable film-forming process such as physical or chemical vapour deposition or, for larger area glass panes, via lamination. During the lamination process, a thin film of the coating material is typically heated to a temperature effective to soften the coating material, which promotes a conformal mating of the coating material to a surface of a glass pane. Mobile polymer chains within the coating material develop bonds with the glass surfaces, which promote adhesion. Elevated temperatures also accelerate the diffusion of residual air and/or moisture from the glass-coating interface.

Articles may be prepared to include the vacuum insulated glass unit described herein. In one or more examples, a window includes the vacuum insulated glass unit. The window may further include a frame. The window may be used for residential or commercial purposes.

Also provided is use of the articles herein. For example, one or more examples provides use of the vacuum insulated glazing unit for a window. One or more example provides use of the glass pane and/or the tempered glass pane for a vacuum insulated glazing unit. One or more example provides use of the window for a fixed or ventilating window of a commercial building and/or residential building. One or more example provides use of the window for a roof window or a skylight window, for example a fixed or ventilating window for a roof or a skylight. One or more examples provides use of the window for a vertical window application, such as for use on the side of a commercial and/or residential building. The vacuum insulated glazing unit, glass pane, tempered glass pane, and window described herein can also be used for other applications that use a window or transparent screens, for example viewports, console screens, time pieces, vehicles, and others.

REFERENCES 1 vacuum insulated glazing unit (VIG)
2 spacers
6 side seal material
6a side seal material after foaming and before sealing
8 gap forming a void
10 first glass pane
11 outer surface of the first glass pane
12 inner surface of the first glass pane
14 first periphery of the first glass pane
15 second periphery of the first glass pane
16 third periphery of the first glass pane
17 fourth periphery of the first glass pane
20 second glass pane
21 outer surface of the second glass pane
22 inner surface of the second glass pane
24 gaps between the dense side seal material and the second glass pane
30 gaseous void in the side seal material
h height of the dense side seal material
$w_{SSM}$ width of the side seal material
S distance between the spacers
T thickness of the first glass pane and/or the second glass pane
100 pre-heating of the first glass pane
102 providing a first glass pane
104 positioning a side seal material on the first glass pane
106 pre-heating the side seal material to a pre-heating temperature
110 cooling the pre-heated side seal material allowing it to solidify
112 positioning spacers on the first glass pane
114 positioning spacers on the second glass pane
118 semi-paring of the first glass pane and the second glass pane
120 assembling the VIG unit
122 pairing of the first glass pane and the second glass pane
124 joining the first glass pane and the second glass pane to form a glass unit
126 sealing the glass unit to form a VIG unit

The invention claimed is:
1. A method for producing a vacuum insulated glazing (VIG) unit, the method comprising:
   providing a first glass pane having an inner surface with a peripheral edge;

positioning a side seal material on the peripheral edge of the inner surface of the first glass pane, wherein the side seal material comprises a solder glass material component;

pre-heating the side seal material to a pre-heating temperature ($T_{PH}$) using a pre-heating heat source, wherein at the pre-heating temperature ($T_{PH}$) the side seal material foams and densifies to form a dense side seal material, wherein during foaming of the side seal material gaseous inclusions from the side seal material outgasses, wherein the side seal material has:

an initial side seal density prior to being pre-heated;

a foaming side seal density during foaming of the side seal material, wherein the initial side seal density is larger than the foaming side seal density by at least 100%; and a dense side seal density after pre-heating of the side seal material where the dense side seal material is formed, wherein the dense side seal density is larger than the foaming side seal density by at least 50%, wherein the method further comprises:

providing a second glass pane having an inner surface, providing spacers, and assembling the VIG unit such that the VIG unit comprises:

the first glass pane and the second glass pane arranged in parallel with the inner surfaces opposing each other; and spacers arranged between the opposed inner surfaces, and arranging the dense side seal material peripherally between the first glass pane and the second glass pane creating a sealed cavity between the glass panes.

2. The method for producing a VIG unit according to claim 1, wherein the pre-heating heat source comprises at least a first pre-heating heat source, the first pre-heating heat source being a laser emitting light in the near-infrared or infrared wavelength range, wherein the laser is a continuous wave laser or a pulsed laser.

3. The method for producing a VIG unit according to claim 2, wherein the pre-heating of the side seal material is obtained by moving the first pre-heating heat source around the peripheral edge of the inner surface of the first glass pane multiple times in a raster scan manner.

4. The method for producing a VIG unit according to claim 1 further comprising:

positioning a side seal material on the peripheral edge of the inner surface of the second glass pane after providing the second glass pane but prior to assembling the VIG unit;

pre-heating the side seal material on the peripheral edge of the inner surface of the second glass pane to a pre-heating temperature ($T_{PH}$) using a pre-heating heat source, wherein at the pre-heating temperature ($T_{PH}$) the side seal material foams and densifies to form a dense side seal material, wherein during foaming of the side seal material gaseous inclusions from the side seal material outgasses.

5. The method for producing a VIG unit according to claim 1, wherein the pre-heating of the side seal material is conducted at atmospheric pressure or under reduced pressure in a vacuum chamber.

6. The method for producing a VIG unit according to claim 5, wherein the pre-heating of the side seal material is conducted under reduced pressure in a vacuum chamber.

7. The method for producing a VIG unit according to claim 1, wherein pre-heating the side seal material to form the dense side seal material where gaseous inclusions from the side seal material has outgassed takes less than 5 minutes.

8. The method for producing a VIG unit according to claim 1, wherein gaseous inclusions in the dense side seal material constitutes less than 15% of a total volume of the dense side seal material.

9. The method for producing a VIG unit according to claim 1, wherein the pre-heating heat source comprises a first pre-heating heat source, and a second pre-heating heat source, wherein the first pre-heating heat source is a laser emitting light in the near-infrared or infrared wavelength range, wherein the laser is a continuous wave laser or a pulsed laser, and wherein the second pre-heating heat source is-being a near-infrared or an infrared light source, wherein the peripheral edge of the inner surface of the first glass pane comprises a first periphery, a second periphery, a third periphery, and a fourth periphery, wherein the pre-heating of the side seal material is obtained by:

moving the first pre-heating heat source along the first periphery of the first glass pane;

turning the first glass pane 90 degree;

moving the first pre-heating heat source along the second periphery of the first glass pane;

moving the second pre-heating heat source along the third periphery of the first glass pane;

turning the first glass pane 90 degree; and moving the second pre-heating heat source along the fourth periphery of the first glass pane.

10. The method for producing a VIG unit according to claim 1, wherein the pre-heating temperature ($T_{PH}$) is at least 350 degrees Celsius.

11. The method for producing a VIG unit according to claim 1 further comprising heating at least the peripheral edge of the first glass pane to a pane temperature ($T_{Pane}$), wherein the pane temperature ($T_{Pane}$) is lower than the pre-heating temperature ($T_{PH}$).

12. The method for producing a VIG unit according to claim 1, wherein the solder glass material component comprises at least one oxide selected from vanadium oxide, barium oxide, zinc oxide, bismuth oxide, aluminum oxide, silicon oxide, magnesium oxide, chromium oxide, iron oxide, cobalt oxide, sodium oxide, manganese oxide, tantalum oxide, molybdenum oxide, niobium oxide, tellurium oxide, or any combinations of one or more thereof.

13. The method for producing a VIG unit according to claim 1, wherein assembling the VIG unit comprises:

forming a paired glass pane unit by arranging the first glass pane and the second glass pane with inner surfaces opposing each other thereby creating a void between the first glass pane and the second glass pane;

evacuating the void between the first glass pane and the second glass pane;

sealing the paired glass pane unit.

14. The method for producing a VIG unit according to claim 13, further comprising cooling the dense side seal material to a solidifying temperature ($T_S$) prior to pairing the first glass pane and the second glass pane, wherein cooling the dense side seal material to the solidifying temperature ($T_S$) is obtained by switching off the pre-heating heat source after the side seal material has outgassed and densified whereby the dense side seal material has been formed.

15. The method for producing a VIG unit according to claim 13, wherein the forming the paired glass pane unit is conducted under reduced pressure in a vacuum chamber.

16. The method for producing a VIG unit according to claim 15, wherein the pre-heating of the side seal material is conducted in the same vacuum chamber as the forming the paired glass pane unit.

17. The method for producing a VIG unit according to claim 13, wherein the sealing of the paired glass pane unit is obtained by heating at least the glass pane unit peripherally to a heating temperature ($T_H$).

18. The method for producing a VIG unit according to claim 1, wherein the first glass pane and the second glass pane are strengthened glass panes, wherein the first glass pane and the second glass pane have been strengthened by thermal tempering.

* * * * *